United States Patent [19]
Ferree et al.

[11] Patent Number: 5,927,055
[45] Date of Patent: Jul. 27, 1999

[54] PIVOTING MOWER DECK MECHANISM

[75] Inventors: Philip Eugene Ferree, Madison, Wis.; Robert Dean Davis, Jr., Jackson, Mich.

[73] Assignee: Deere & Company, Moline, Ill.

[21] Appl. No.: 08/895,281

[22] Filed: Jul. 16, 1997

[51] Int. Cl.$^6$ .................................................. A01D 34/64
[52] U.S. Cl. ...................... 56/15.9; 56/16.3; 56/DIG. 22
[58] Field of Search .................................. 56/214, 320.1, 56/DIG. 22, 6, 7, DIG. 9, 15.7, 15.9, 16.3

[56] References Cited

U.S. PATENT DOCUMENTS

| 4,490,966 | 1/1985 | Kuhn et al. ............................... 56/15.9 |
| 4,563,019 | 1/1986 | Kuhn et al. ............................... 280/481 |
| 4,779,406 | 10/1988 | Schroeder ................................ 56/15.9 |
| 4,829,754 | 5/1989 | Shimamura et al. ................. 56/15.9 X |
| 4,869,057 | 9/1989 | Siegrist ..................................... 56/15.9 |
| 5,069,022 | 12/1991 | Vandermark ................................. 56/6 |
| 5,079,907 | 1/1992 | Sameshima et al. ..................... 56/15.9 |
| 5,079,926 | 1/1992 | Nicol ......................................... 56/12.7 |
| 5,381,648 | 1/1995 | Seegert et al. ...................... 56/15.9 X |
| 5,459,984 | 10/1995 | Reichen et al. ............................... 56/7 |
| 5,784,870 | 7/1998 | Seegert et al. ......................... 56/320.1 |

FOREIGN PATENT DOCUMENTS

| 2608006 | 12/1987 | France . |
| 04 237418 | 8/1992 | Japan . |
| 05 184217 | 7/1993 | Japan . |
| 08 256556 | 10/1996 | Japan . |

OTHER PUBLICATIONS

Brochure–Grasshopper Mid–Size Series 612/614 Mowers, 1 page dated 1991.
Brochure—The ProCut Z Zero–Turn Rider, Ferris Industries, 2 pages date unknown.

*Primary Examiner*—Heather Shackelford

[57] ABSTRACT

A locking mechanism for latching together front and rear frame portions which are pivotal to expose the underside of a deck. The locking mechanism includes a lever, intermediate link and blocking member that provide an over-center feature for securing the locking mechanism in its latched mode. Pivoting of the lever lifts the front and rear frame portions to their proper orientation for being latched together by the locking mechanism.

46 Claims, 6 Drawing Sheets

PIVOTING MOWER DECK MECHANISM

This invention pertains to mower decks that pivot to expose the underside of the deck for service, and the mechanisms which shift these mower decks between their various positions.

It is known to provide a vehicle with a mowing chamber or mower deck within which blades rotate for cutting grass and vegetation. The mower deck is coupled with the vehicle for being propelled forwardly across the area to be mowed. Some such mower decks are mounted in front of the vehicle. This allows the mower deck to cut the grass before the vehicle tires roll across the grass, thereby enhancing the quality of cut. It is known to provide mechanisms that allow an operator to pivot these front mounted mower decks upwardly so as to expose the underside of the mower deck for service. The operator will stop the vehicle, disconnect the drive mechanism that transmits power from the engine to the mower blades, and pivot the mower deck to its service position whereat the underside is exposed for maintenance such as blade replacement and deck cleaning. Also, when these decks are pivoted to their service positions the mower deck and vehicle occupy less floor space. The compactness of the vehicle with the deck in the pivoted configuration allows the vehicles to occupy less space when stored and allows more vehicles to be loaded onto a truck for transport.

Some of these pivotal deck mechanisms include a hydraulic system with hydraulic cylinders which when actuated by the operator will pivot the deck to its raised maintenance position. These systems are typically relatively easy for the operator to use, but are relatively expensive due to the high cost of the hydraulic components required. Other pivotal deck mechanisms require the operator to manually lift the deck to its raised maintenance position. These mechanisms often include complex linkages for allowing the deck to pivot up to its service position. Also, operation of these mechanisms can be difficult for the operator. The process of unlatching the deck for allowing it to pivot to the service position can be a difficult and awkward process. Also, the process of returning the deck to its normal mowing configuration whereat the deck is rigidly held in position can be relatively difficult and awkward for the operator to perform.

Therefore, it would be desirable to provide a mowing vehicle with a mower deck that can be pivoted upwardly to a service position whereat the underside of the deck is exposed for maintenance. It would be desirable for such a mechanism to be manually operated such that the cost of manufacturing and assembling the mechanism is relatively low. It would be desirable for such a mechanism to be easily operated such that the process of pivoting the deck to its service position is not difficult or awkward, and such that the process of returning the deck to its normal mowing configuration is also not difficult or awkward.

SUMMARY OF THE INVENTION

The present invention provides a front mounted mower deck having a frame from which the deck is suspended in front of the vehicle. The frame includes front and rear portions pivotally connected to each other. The present invention allows the operator to pivot the front frame portion and deck upwardly with respect to the rear frame portion and vehicle. This exposes the underside of the deck for maintenance, and allows the vehicle and frame to assume a more compact configuration for storage or transport. The present invention includes a locking mechanism that securely latches the front and rear frame portions in their operative positions during the mowing mode. A blocking member coupled with the front frame portion abuts a tab mounted to the rear frame portion. An intermediate link operatively couples the blocking member with a lever engagable by the operator. The locking mechanism linkage includes an over center feature that maintains the linkage in its locked and latched configuration by utilizing the force transmitted by abutment of the blocking member against the tab. The force applied to the blocking member through the tab corresponds with the weight of the deck and frame, and is transmitted through the locking mechanism linkage to maintain the locking mechanism in its locked mode such that the front and rear frame portions remain rigidly locked together as a unit. The operator can pivot the lever to a released position whereat the locking mechanism is released and the front and rear frame portions are allowed to pivot with respect to each other. The operator may then pivot the deck and front frame portion up to the service position. To re-latch the frame to begin mowing operations again, the operator first swings the front frame portion and deck back down onto the ground. The operator then presses the lever to its engages position, which serves to press the blocking member against the tab. This acts to lift the front and rear frame portions to their horizontal positions whereat the locking member can again latch the frame portions together. As the operator continues to depress the lever, the over center feature engages and the locking mechanism is again securely held in its latched mode.

DETAILED DESCRIPTION OF THE PREFERRED EMBODIMENT

Figure 4:
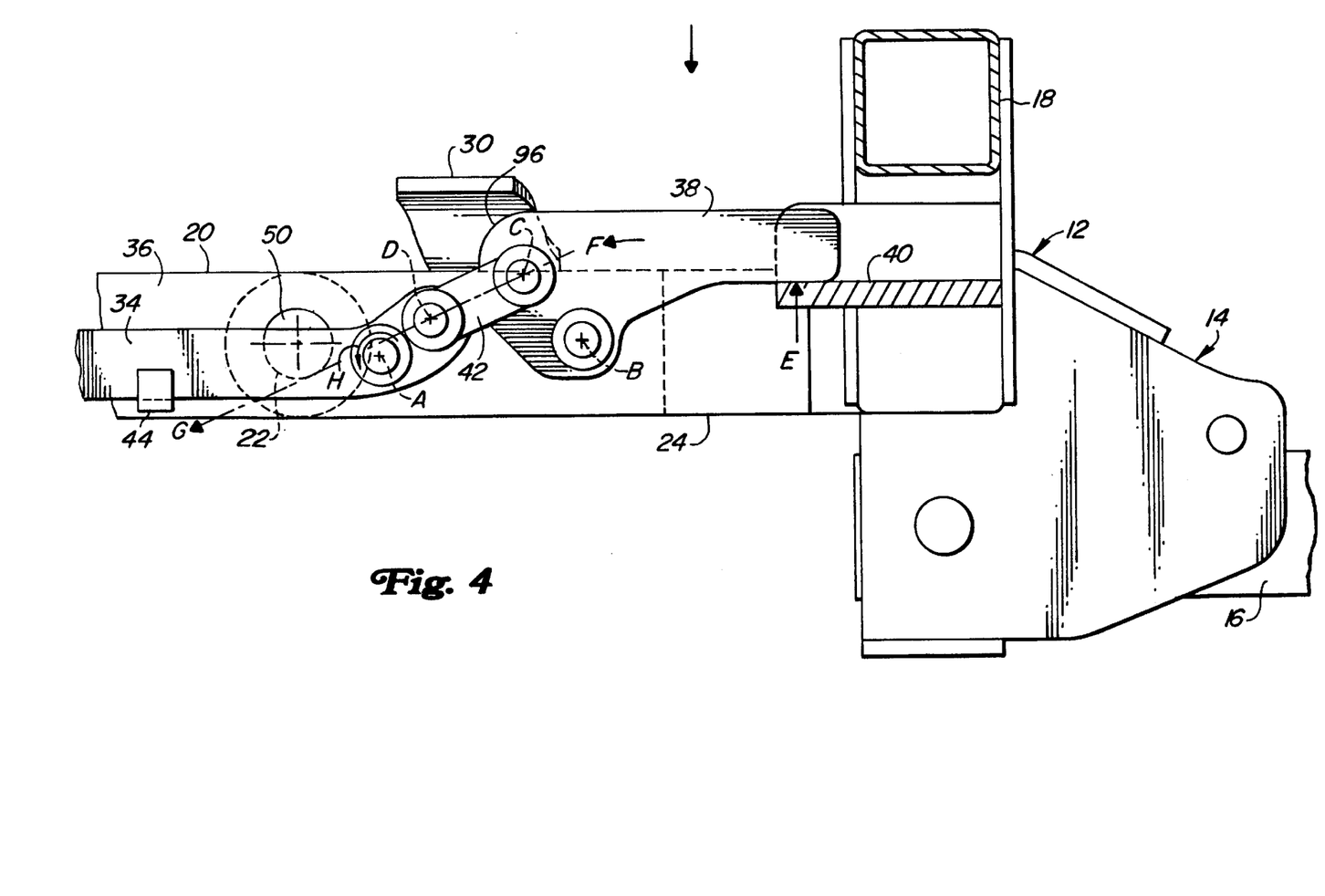
FIG. 4 is a partial side view of the locking mechanism in its latched mode.
Figure 5:
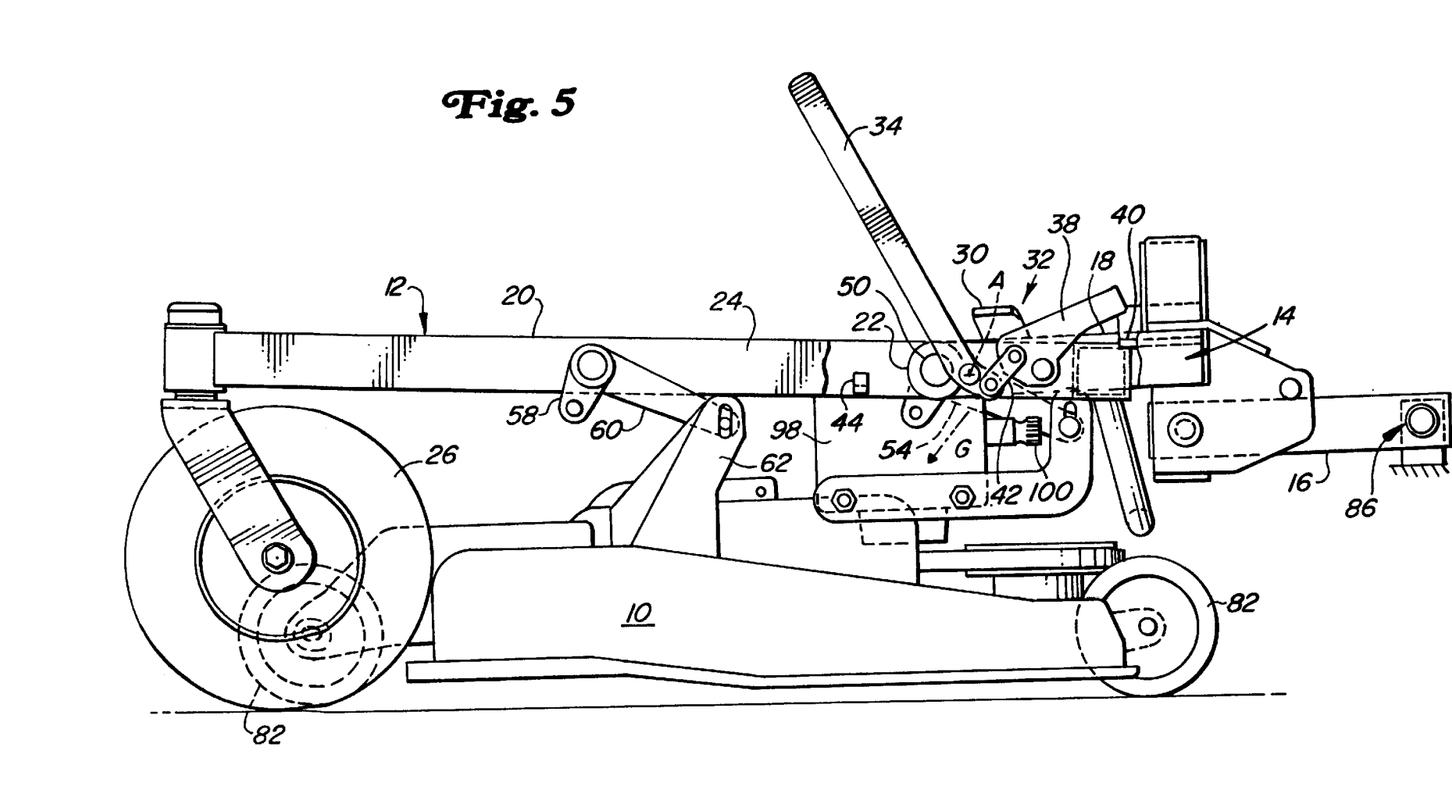
FIG. 5 is a partial side view of the frame structure, deck and locking mechanism showing the locking mechanism unlatched or disengaged for allowing the operator to pivot the deck and front frame to a service position.
Figure 6:
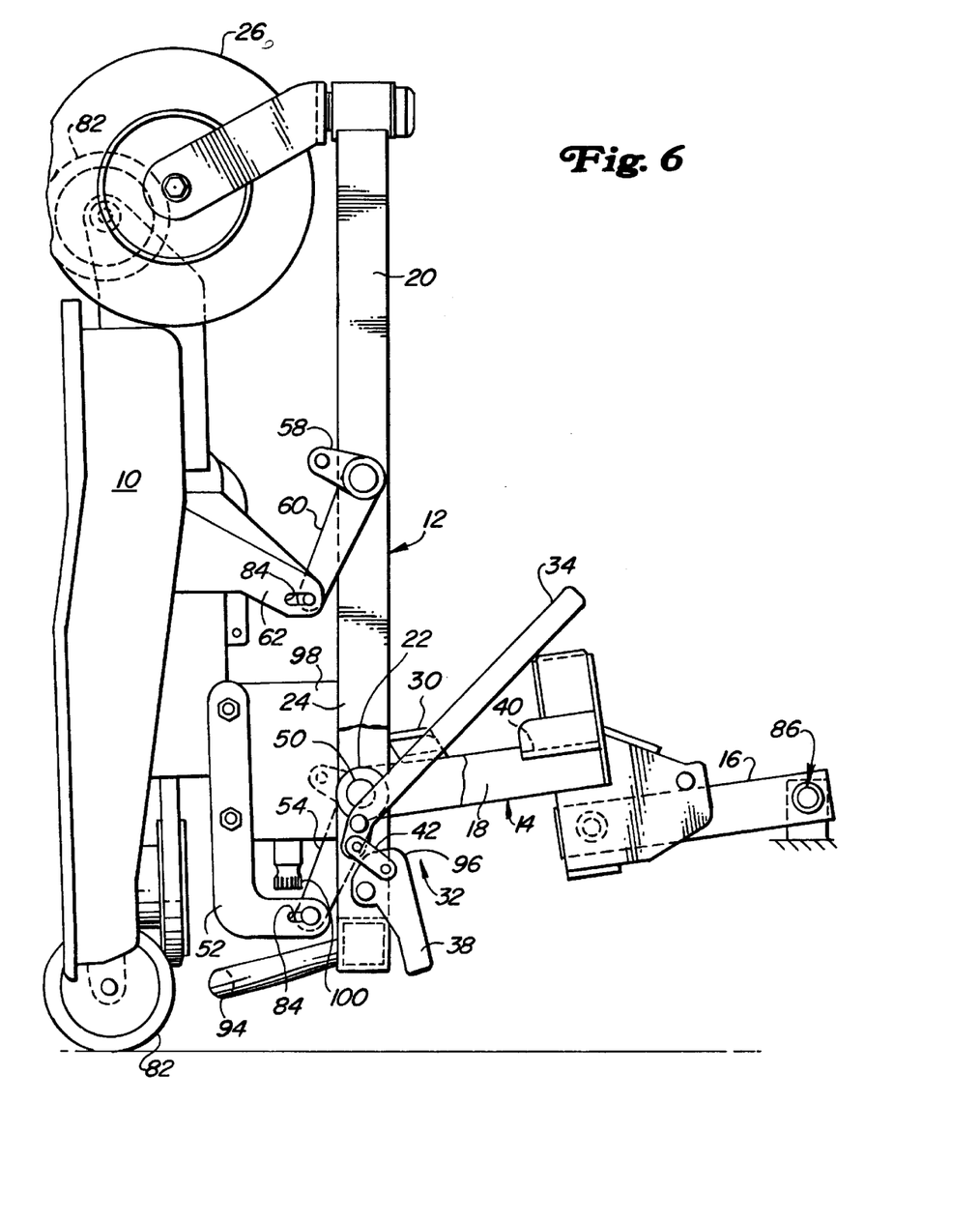
FIG. 6 is a partial side view of the locking mechanism in its unlatched mode, with the frame structure and deck pivoted to their service positions.

Referring now to FIGS. 1–6, there is shown the preferred embodiment of the present invention. A mowing vehicle (not shown) includes an engine or other power source which operatively drives ground engaging wheels for propelling the vehicle forwardly. The power source also drives blades within a mower deck 10 that is positioned in front of the vehicle. The front mounted mower deck 10 is operatively coupled with the vehicle by way of a frame structure 12. The frame 12 includes a first or rear portion 14 that is pivotally coupled with the vehicle. The rear frame portion 12 includes a pair of push arms 16 pivotally coupled with the vehicle generally between the vehicle's front wheels, and a first U-shaped structural member 18 fixed with the push arms 16. The frame 12 also includes a second or front portion 20 which is pivotally coupled with the rear frame portion 14 by way of pivotal connections 22. The front frame portion 20 includes a second U-shaped structural member 24 having a pair of caster wheels 26 mounted thereto. The front frame portion 20 rests against stops 30 when the deck 10 is pivoted upwardly to its service position, as is shown in FIG. 6. The stops 30 mounted to the rear frame portion 14 limit the pivotal motion of the front frame portion 20 in the other direction as the deck 10 is lifted to the service position exposing the underside of the deck 10. The front and rear frame portions 20 and 14 are rigidly held together during operation to prevent pivoting of the front frame 20 with respect to the rear frame 14 by way of a locking mechanism 32 which will be described in greater detail below.

A locking mechanism 32 operatively extends between the front and rear frame portions 20 and 14 for preventing the front and rear portions 20 and 14 from pivoting with respect to each other during mowing operations. The locking mechanism 32 is selectively releasable by the operator to allow the deck 10 to be pivoted up to its service position. A lever 34 engagable by the operator's hand is mounted to a structural member 36 which forms part of the front frame portion 20. The lever 34 is mounted for pivoting with respect to the structural member 36 about axis A, as best seen in FIG. 4. A blocking member 38 is also mounted to the structural member 36 for pivoting about axis B. The blocking member 38 is abutable with a tab structure 40 mounted with the rear frame portion 14. As will be described in greater detail below, abutment of the blocking member 38 against the tab structure 40 serves to operatively fix the front and rear frame portions 20 and 14 together and prevents pivotal motion of the front and rear frame portions 20 and 14 with respect to each other about the pivotal connections 22. An intermediate link 42 is coupled to the blocking member 38 for pivoting about axis C and is coupled to the lever 34 for pivoting about axis D. The intermediate link 42 acts to transmit forces and motion between the blocking member 38 and lever 34. A cradle 44 is mounted to the structural member 36 and abuts the lever 34 to limit the travel of the lever 34 in one direction.

Figure 1:
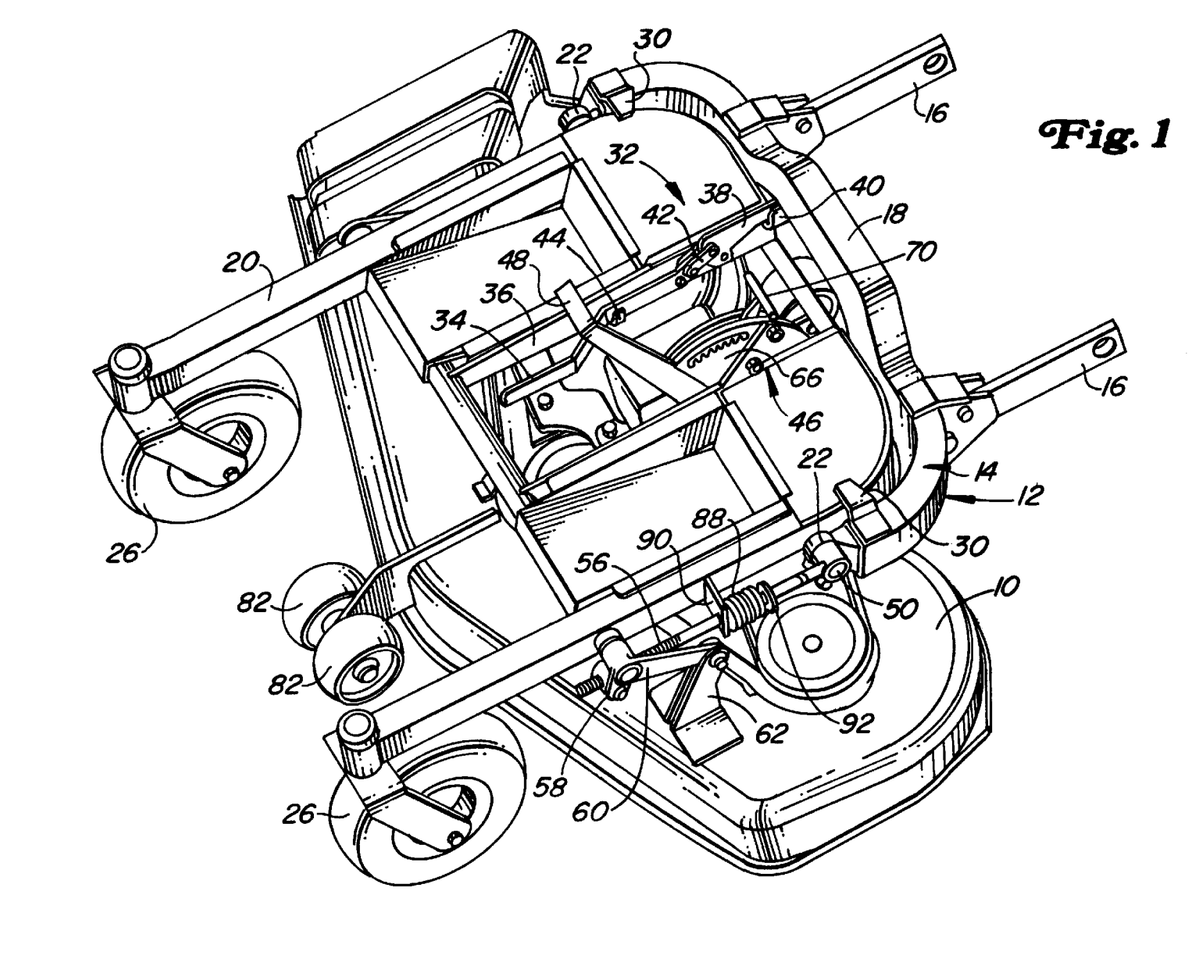
FIG. 1 is a perspective view of the frame structure adapted for being pivotally coupled with a vehicle (not shown). The mower deck is suspended from the frame structure. The locking mechanism according to the present invention is shown in the latched mode in engagement between first and second portions of the frame structure.
Figure 2:
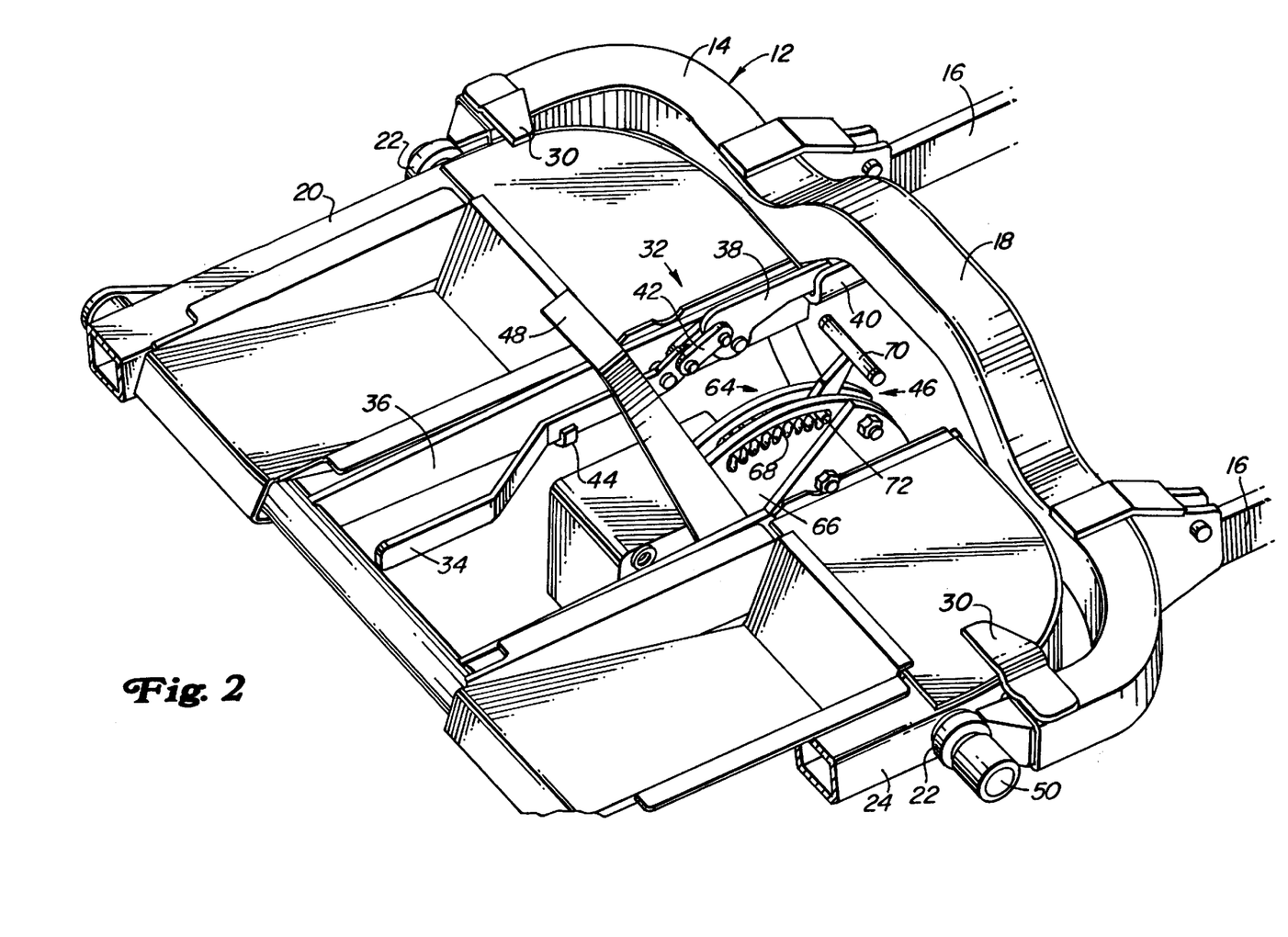
FIG. 2 is a perspective view of the locking mechanism according to the preferred embodiment with the locking mechanism in a latched mode for securing the front and rear frame portions together during mowing operation.
Figure 3:
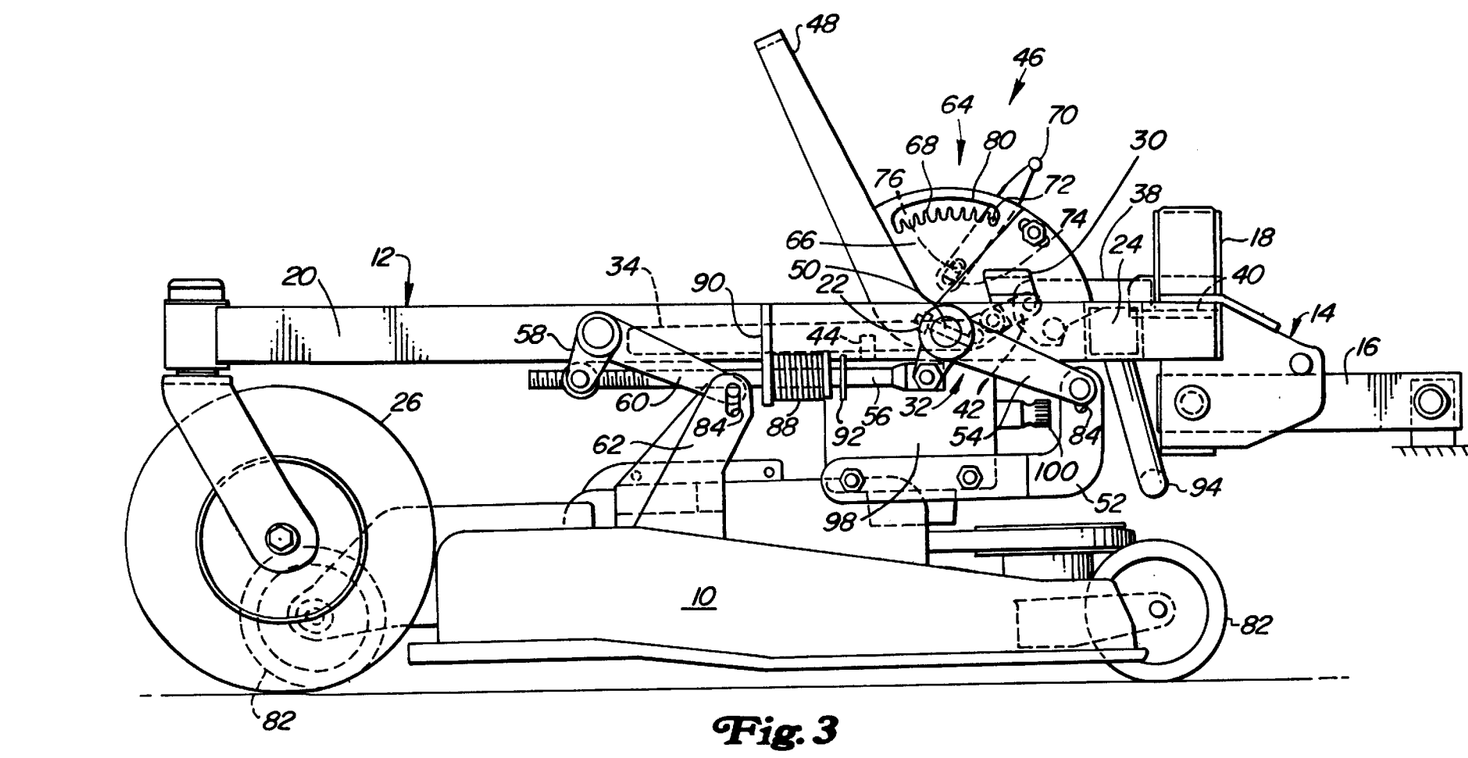
FIG. 3 is a side view of the frame structure, deck, locking mechanism and height adjustment mechanism with the locking mechanism shown in a latched mode for securing the front and rear frame portions together during mowing operations.

The present invention includes a mower deck height adjustment mechanism 46 which is best seen in FIG. 3. The height adjustment mechanism 46 includes a foot pedal 48 engagable by the operator's foot. The foot pedal 48 is pivotally supported by a first shaft 50 which is supported by the front frame portion 20. An L-shaped link 52 is coupled with the foot pedal 48 and is also pivotally coupled with the rear middle portion of the deck 10. First arms 54 are fixed with the outer ends of the first shaft 50. Rods 56 extend between the first arm 54 and a second arm 58 pivotally supported by the front frame portion 20. Third arms 60 fixed with the second arms 58 extend outwardly and are coupled with mounting brackets 62 fixed with the top of the mower deck 10. The height of the deck 10 above the ground is adjusted as the operator pivots the foot pedal 48 with his foot. A latching mechanism 64 is also provided by the height adjustment mechanism 46 for latching the deck 10 at a selected cutting height. A pair of plates 66 are fixed with the front frame portion 20 and define a plurality of upwardly extending teeth 68. A handle 70 is positioned between the plates 66, and includes a pin 72 positionable within the gaps between adjacent teeth 68. A slot 74 in the handle 70 receives a peg member 76 operatively fixed between the plates 66. The slot 74 allows the handle 70 to be pulled upwardly by the operator such that the pin 72 is clear of the teeth 68 for allowing the handle 70 to be pivoted about the peg 76 to a new position corresponding to a different cutting height. A tension spring 78 extending between the pin 72 and the peg 76 biases the handle 70 downwardly such that the pin 72 is urged into one of the gaps between the teeth 68. The foot lever 48 includes an abutment portion 80 which abuts against the handle 70 to thereby set the height at which the deck 10 is suspended above the ground.

A plurality of gage wheels 82 are coupled with the deck 10 and engage the ground when undulations are encountered during mowing operations. As these anti-scalp wheels 82 contact the ground the deck 10 is allowed to shift upwardly with respect to the frame 12 to ride over the ground undulations. Slots 84 formed in the linkage that suspends the deck 10 from the front frame portion 20 provide clearance for the deck 10 to shift upwardly in this manner with respect to the frame 12. These slots 84 are formed in the brackets 62 and L-shaped link 52.

Next, the operation of the present invention will be described in greater detail. When the vehicle is operating in the mowing mode, the frame structure 12 and locking mechanism 32 are in the configuration as shown in FIGS. 1–4. The front and rear frame portions 20 and 14 are rigidly fixed together by the locking mechanism 32 such that there is no pivotal motion of the front frame portion 20 with respect to the rear frame portion 14 about the pivotal connections 22. The push arms 16 pivotally coupled with the vehicle by way of couplings 86 allow the frame 12 and mower deck 10 to pivot with respect to the vehicle to ride up and down over ground undulations. The locking mechanism 32 serves to lock the front and rear frame portions 20 and 14 together as a unit when the lever 34 is positioned against the cradle 44. The locking mechanism 32 provides an over-center feature that locks the mechanism in place and secures the front and rear frame portions 20 and 14 together. As best seen in FIG. 4, the lever 34 is in its downwardmost position against the cradle 44 and the blocking member 38 is in abutment with the tab member 40. The intermediate link 42 is positioned such that arrow G, which extends through the axes C and D, passes to one side of the axis A. As the weight of the deck 10 urges the front frame portion 20 downwardly, the weight of the deck effectively imparts a force to the blocking member 38 via the tab 40 in the direction of arrow E. This force urges the blocking member 38 to pivot about connection point B in the direction of arrow F. This tends to urge the intermediate link 42 in the direction of arrow G. The force is transmitted by the intermediate link 42 to the lever 34 along arrow G. Since the force arrow G passes to one side of the connection point A, the force imparted to the lever 34 by the intermediate link 42 urges the lever 34 to pivot counterclockwise in the direction of arrow H about connection point A. However, pivotal movement of the lever 34 in this direction is restricted by abutment of the lever 34 against the cradle 44. Therefore, the lever 34, intermediate link 42 and blocking member 38 remain stationary as the lever 34 abuts the cradle 44. The over center feature insures that the force E is transmitted through the locking mechanism's linkage to the lever 34 in such a way that the lever 34 is urged in the direction of arrow H such the lever 34 remains stationary. Due to the over-center feature, the weight of the front frame portion 20 and deck 10 cause the lever 34, intermediate link 42 and blocking member 38 to remain fixed in position and the locking mechanism 32 thereby securely locks the front and rear frame portions 20 and 14 together in their proper orientation. The blocking member 38 rigidly resists the forces imparted to it from the tab 40 in the direction of arrow E, and the frame portions 14 and 20 remain rigidly locked together.

To pivot the deck 10 up to its service position, the operator stops forward travel, stops the vehicle power source, and removes a quick connect sleeve from the shaft that drives the mower blade. The portion of the drive shaft coupled with the mower deck 10 can rest on a support 94 which generally cradles the shaft as the deck is pivoted to its service position. The operator then lifts the lever 34 in a first direction from its position shown in FIGS. 1–4 in abutment with the cradle 44 to its position shown in FIG. 5. As the lever 34 is lifted, the point D will swing about point A in the clockwise direction from the position shown in FIG. 4, causing the intermediate link 42 to pivot. Until the line G extending through points C and D swings into alignment with point A, the force applied along arrow G caused by the weight of the deck 10 and frame 20 will operatively urge the lever 34 back toward the cradle 44 in the direction of arrow H such that the operator must apply a force to the lever 34 to unlock the locking mechanism 32. But once line G passes across point A, or over center, such that line G extends beneath connection point A as shown in FIG. 5, the force imparted along arrow E will urge the blocking member 38 in the direction of arrow F and the intermediate link 42 in the direction of arrow G such that the lever 34 swings away from the cradle 44 in a clockwise direction as viewed in FIGS. 4 and 5. The front frame portion 20 is then allowed to pivot downwardly easily under its own weight. Pivoting of the lever 34 upwardly away from the cradle 44 causes the blocking member 38 to pivot clockwise to the position shown in FIG. 5 until the blocking member 38 is generally clear of the tab 40. As the locking mechanism 32 is released and the front and rear frames 20 and 14 are no longer rigidly held together, the front and rear frame portions 20 and 14 pivot with respect to each other about the connection points 22. The connection points 22 will drop downwardly under the weight of the frame 12 and deck 10 as the front and rear frame portions 20 and 14 pivot with respect to each other. The front frame portion 20 will pivot from the horizontal in a clockwise direction about the front caster wheels 26 until the deck's gage wheels 82 come to rest on the ground in the position shown in FIG. 5. As the connection points 22 shift downwardly, the rear frame portion 14 and push arms 16 pivot in the counterclockwise direction about the connections 86 to the position shown in FIG. 5.

With the deck 10 resting on the ground after the operator has lifted the lever 34 as shown in FIG. 5, the operator can grasp the front portion of the deck 10 or front frame portion 20 for pivoting the deck 10 and front frame 20 upwardly. The front frame portion 20 and deck 10 can be pivoted upwardly with respect to the rear frame portion 14 about the connection points 22 until the front frame portion 20 abuts against stops 30 mounted to the rear frame portion 14. With the deck 10 and front frame portion 20 pivoted to the position shown in FIG. 6, access is provided to the underside of the deck 10 for allowing the operator to perform maintenance operations such as blade replacement and cleaning.

To return the deck 10 to its operational mode, the operator grasps the deck 10 or front frame portion 20 and swings the deck 10 and front frame portion 20 back to the ground. With the deck 10 resting on the ground again as shown in FIG. 5, the front and rear frame portions 20 and 14 are at slight angles to the horizontal, and must be lifted slightly to their horizontal positions in order to be latched in their operational configuration. To accomplish this the operator will pivot the lever 34 in a second direction downwardly and forwardly. Downward pivoting of the lever 34 in the direction of arrow H causes the intermediate link 42 to shift generally upwardly and the blocking member 38 to pivot clockwise about connection point B. The blocking member 38 will abut the tab 40, and as the operator continues to pivot the lever 34 in the direction of arrow H the blocking member 38 pivots clockwise and in abutment with the tab 40 such that the front frame portion 20 is lifted upwardly. The front frame portion 20 pivots upwardly until the lever 34 abuts the cradle 44 as the front frame portion 20 reaches the horizontal alignment. The locking mechanism 32 of the present invention thereby allows the operator to apply a force to the lever 34 to help lift the front frame portion 20 for realignment with the rear frame portion 14. As the front frame portion 20 swings upwardly counterclockwise in this fashion, the rear frame portion 14 swings upwardly clockwise to a generally horizontal orientation. As the lever 34 is pressed downwardly by the operator the intermediate link 42 shifts such that the arrow G aligned with the intermediate link 42 will shift upwardly past axis A, or over center. Once the force arrow G passes over center in this fashion the locking mechanism 32 becomes securely locked for preventing the frame portions 14 and 20 from pivoting with respect to each other, and the over-center feature utilizes the weight of the deck 10 and front frame portion 20 to maintain the locking mechanism 32 in its latched mode as described above.

When the lever 34 is lifted and the locking mechanism 32 is released, the blocking member 38 may shift beneath the tab 40 as the deck 10 drops to the ground. When the operator wishes to lock the locking mechanism 32 after this has occurred the operator can press the foot pedal 48 rearwardly toward the vehicle which will cause the foot pedal 48 to bottom out in the slot 74 in the L-shaped member 52. As the operator continues to press the foot pedal 48 up and back toward the vehicle the force applied by the operator will lift the shaft 50, thereby also lifting the connection point 22 between the front and rear frame portions 20 and 14. Lifting of the connection point 22 causes the front and rear frame portions 20 and 14 to swing upwardly toward their horizontal positions. As the front frame portion 20 swings upwardly, the blocking member 38 will rise up into position to contact the tab 40. Once the blocking member 38 is abutable against the tab 40, the operator can then press downwardly against the lever 34 for pressing the blocking member 38 downwardly against the tab 40 for completely returning the front and rear frame portions 20 and 14 to their horizontal positions as described above.

The corner portion 96 of the blocking member 38, which is best seen in FIG. 4, is sized such that it is abutable with the lever 34 as the blocking member 38 swings counterclockwise about point B. Abutment of the corner portion 96 with the lever 34 in this manner serves to prevent the blocking member 38 from pivoting too far in the counterclockwise direction.

FIGS. 3, 5 and 6 show a deck gearbox 98 and input shaft 100. During operation a drive shaft is permanently fixed with the input shaft 100 of the deck gearbox 98. The drive shaft 100 extends to a vehicle clutch and is operatively driven by the vehicle's engine. Before the operator pivots the deck 10 and frame 12 up to its service position the operator disconnects the drive shaft from the clutch by way of a conventional coupling mechanism. The drive shaft remains fixed with the input shaft 100 of the deck gearbox 98 as the deck and frame 12 pivot up to the service position. A universal joint allows the drive shaft to pivot with respect to the input shaft 100. The support 94 cradles the drive shaft as the deck 10 and frame 12 are pivoted up to their service positions. The drive shaft and universal joint are not shown in FIGS. 3, 5 and 6 for the sake of clarity in the drawings.

Next, the operation of the deck height adjustment mechanism 46 will be described in greater detail. The deck height adjustment mechanism 46 is operative when the front and rear frame portions 20 and 14 are locked together as a single unit by the locking mechanism 32 during normal mowing operations. To change the height of the deck 10, and therefore the height at which grass is cut by the mower deck 10, the operator presses forwardly with his foot against the foot pedal 48. This pivots the foot pedal 48 forwardly about the axis defined by the shaft 50. With the foot pedal 48 pressed forwardly, the engagement portion 80 of the foot pedal 48 shifts away from and out of contact with the pin 72, thereby providing clearance for the pin 72 to be shifted upwardly out of the gap between adjacent teeth 68. The operator can pull upwardly on the handle 70 to pull the pin 72 out of engagement with the teeth 68, and can shift the handle 70 to a new position corresponding to a new cutting height. Once the pin 72 is repositioned in a selected gap, the operator can allow the foot pedal 48 to shift back toward him until the engagement portion 80 again abuts the handle 70. The foot pedal 48 will therefore be in a different position than before, which serves to shift the shaft 50, first arm 54, rod member 56, second and third arms 58 and 60 and deck bracket 62 to new positions. As these parts shift to new positions the deck 10 will correspondingly shift to a new cutting height above the ground.

A spring 88 is received by the rod 56 and is in compression between a portion 90 of the front frame 20 and a flange portion 92 of the rod 56. The force in the compression spring 88 presses the flange 92 and rod 56 away from the portion 90 of the front frame 20 and thereby provides a lift assist mechanism which helps the operator lift the deck 10 during cutting height adjustments.

The locking mechanism 32 is carried by the front frame portion 20 and abuts against the tab 40 mounted to the rear frame portion 14 for locking the frame portions 14 and 20 together. However, the locking mechanism 32 according to the present invention could also be adapted to be mounted to the rear frame portion 14 for abutment with the front frame portion 20 without departing from the spirit of the present invention.

The present invention therefore provides a mowing vehicle with a mower deck 10 that can be pivoted upwardly to a service position whereat the underside of the deck 10 is exposed for maintenance. The mechanism is easily operated such that the process of pivoting the deck 10 to its service position is not difficult or awkward. The locking mechanism according to the present invention is manually operable such that the cost of manufacturing and assembling the mechanism is relatively low. Costly components such as hydraulic cylinders are not required by the present invention. The locking mechanism 32 rigidly latches the front and rear frame portions 20 and 14 together during normal mowing operations. The over-center feature according to the present invention allows the locking mechanism 32 to be relatively simple in construction with relatively few parts. The process of returning the deck 10 to its normal mowing configuration does not require the operator to apply large forces at awkward locations to lift the deck 10 and frame portions 14 and 20 to its latched orientation. Manipulation of the lever 34 of the locking mechanism 32 allows the operator to easily lift the front and rear frame portions 20 and 14 to their respective horizontal positions whereat they can be re-secured to one another. The locking mechanism 32 serves a dual purpose of assisting the operator in lifting the front and rear frame portions 20 and 14 for re-latching, and also securely latches the front and rear frame portions 20 and 14 together. The dual functioning locking mechanism 32 thereby helps reduce the number of parts required by the mechanism and serves to simplify the latching, unlatching and lifting operation. The present invention also provides a deck height adjustment mechanism 46 that allows the operator to apply a force with his foot and select a new cutting height at which the deck 10 is suspended from the frame structure 12. The height adjustment mechanism 46 includes a handle 70 and pin 72 that engage teeth 68 of a plate 66 for securing the deck 10 in the selected position. The height adjust mechanism 48 is relatively simple in construction and easy to operate. No loose parts are provided which could be misplaced.

We claim:

1. A mechanism, comprising:
   a mower deck pivotal to a service position whereat the underside of the mower deck is exposed for maintenance, said mower deck being coupled with a vehicle,
   a frame structure coupled with the vehicle, said deck being supported by the frame structure, said frame structure comprising:
      a first portion pivotally coupled with the vehicle, and
      a second portion pivotally coupled with the first portion,
   ground engaging wheels coupled with the second portion,
   a locking mechanism coupled between the first and second frame portions, said locking mechanism being engagable by an operator to rigidly fix the first and second portions of the frame with respect to each other, said locking mechanism being releasable by said operator for allowing the first and second frame portions to pivot with respect to each other, and
   a lever pivotally supported by one of the frame portions and operatively engagable with the other frame portion, said lever being pivotable by the operator for shifting the first and second frame portions into proper alignment with each other such that the locking mechanism can be engaged.

2. The invention of claim 1, wherein shifting of the lever in a first direction releases the locking mechanism for allowing the first and second frame portions to pivot with respect to each other, and shifting of said lever in a second direction engages the locking mechanism for rigidly fixing the first and second frame portions with respect to each other.

3. The invention of claim 2, wherein said locking mechanism further comprises:
   a pivotable blocking member which pivots in response to pivotal motion of the lever, and
   an intermediate link operatively extending between the lever and the blocking member for transmitting pivotal motion therebetween.

4. The invention of claim 3, wherein said blocking member is pivotally mounted to one of the frame portions and operatively abuts the other of the frame portions for preventing relative motion between the first and second frame portions when the locking mechanism is engaged.

5. The invention of claim 4, wherein said abutment of the blocking member against said frame portion urges the lever in the second direction when the locking mechanism is engaged.

6. The invention of claim 5, and further comprising a cradle member against which the lever abuts for limiting the pivotal movement of the lever in the second direction.

7. The invention of claim 6, wherein in the locked mode a pivotal axis of the lever is on one side of a line extending between the pivotal connection of the intermediate link with the blocking member and the pivotal connection of the intermediate link with the lever, such that abutment of the blocking member against a tab portion of the frame portion urges the intermediate link along said line, which urges the lever in the second direction.

8. The invention of claim 7, wherein as the operator shifts the lever in the first direction from the cradle said line shifts to the other side of the pivotal axis of the lever.

9. The invention of claim 6, wherein abutment of the lever against the cradle prevents the blocking member from pivoting in response to abutment with a tab portion of the frame portion, and locks the first and second frame portions against pivotal motion with respect to each other.

10. The invention of claim 7, wherein abutment of the lever against the cradle prevents the blocking member from pivoting in response to abutment with the tab, and locks the first and second frame portions against pivotal motion with respect to each other.

11. A mechanism, comprising:
    a mower deck pivotal to an upright service position whereat the underside of the mower deck is exposed for maintenance, said mower deck being coupled with a vehicle,
    a frame structure coupled with the vehicle, said deck being supported by the frame structure, said frame structure comprising:
        a first portion pivotally coupled with the vehicle, and
        a second portion pivotally coupled with the first portion,
    ground engaging wheels coupled with the second portion,
    a locking mechanism coupled between the first and second frame portions, said locking mechanism being engagable by an operator to rigidly fix the first and second portions of the frame with respect to each other, said locking mechanism being releasable by said operator for allowing the first and second frame portions to pivot with respect to each other, and
    a lever shiftable in a first direction for releasing the locking mechanism for allowing the first and second frame portions to pivot with respect to each other, said lever being shiftable in a second direction for engaging the locking mechanism for rigidly fixing the first and second frame portions with respect to each other, and the lever is pivotally supported by one of the frame portions and is operatively engagable with the other of the frame portions, said lever being pivotable in the second direction for shifting the first and second frame portions into proper alignment with each other such that the locking mechanism can be engaged.

12. The invention of claim 11, wherein said deck is coupled with the second frame portion.

13. The invention of claim 11, wherein said locking mechanism further comprises:
    a pivotable blocking member which pivots in response to pivotal motion of the lever, and
    an intermediate link operatively extending between the lever and the blocking member for transmitting pivotal motion therebetween.

14. The invention of claim 13, wherein said blocking member is pivotally mounted to one of the frame portions and operatively abuts the other of the frame portions for preventing relative motion between the first and second frame portions when the locking mechanism is engaged.

15. The invention of claim 14, wherein said abutment of the blocking member against said frame portion urges the lever in the second direction.

16. The invention of claim 15, and further comprising a cradle member against which the lever abuts for limiting the pivotal movement of the lever in the second direction.

17. The invention of claim 16, wherein in the locked mode a pivotal axis of the lever is on one side of a line extending between the pivotal connection of the intermediate link with the blocking member and the pivotal connection of the intermediate link with the lever, such that abutment of the blocking member against a tab portion of the frame portion urges the intermediate link along said line, which urges the lever in the second direction.

18. The invention of claim 17, wherein as the operator shifts the lever in the first direction from the cradle said line shifts to the other side of the pivotal axis of the lever.

19. The invention of claim 16, wherein abutment of the lever against the cradle prevents the blocking member from pivoting in response to abutment with a tab portion of the frame portion, and locks the first and second frame portions against pivotal motion with respect to each other.

20. The invention of claim 17, wherein abutment of the lever against the cradle prevents the blocking member from pivoting in response to abutment with the tab, and locks the first and second frame portions against pivotal motion with respect to each other.

21. A mechanism, comprising:
    a mower deck pivotal to an upright service position whereat the underside of the mower deck is exposed for maintenance, said mower deck being coupled with a vehicle,
    a frame structure coupled with the vehicle, said deck being supported by the frame structure, said frame structure comprising:
        a first portion pivotally coupled with the vehicle, and
        a second portion pivotally coupled with the first portion,
    ground engaging wheels coupled with the second portion,
    a locking mechanism coupled between the first and second frame portions, said locking mechanism being engagable by an operator to rigidly fix the first and second portions of the frame with respect to each other, said locking mechanism being releasable by said operator for allowing the first and second frame portions to pivot with respect to each other,
    a lever shiftable in a first direction for releasing the locking mechanism for allowing the first and second frame portions to pivot with respect to each other, said lever being shiftable in a second direction for engaging the locking mechanism for rigidly fixing the first and second frame portions with respect to each other,
    said lever being pivotally supported by one of the frame portions and operatively engagable with the other of the frame portions for shifting the first and second frame portions into proper alignment with each other as the lever is shifted in the second direction
    wherein said locking mechanism further comprises:
        a pivotable blocking member which pivots in response to pivotal motion of the lever, and
        an intermediate link operatively extending between the lever and the blocking member for transmitting pivotal motion therebetween.

22. The invention of claim 21, wherein said blocking member is pivotally mounted to one of the frame portions and operatively abuts the other of the frame portions for preventing relative motion between the first and second frame portions when the locking mechanism is engaged.

23. The invention of claim 22, wherein said abutment of the blocking member against said frame portion urges the lever in the second direction.

24. The invention of claim 23, and further comprising a cradle member against which the lever abuts for limiting the pivotal movement of the lever in the second direction.

25. The invention of claim 24, wherein in the locked mode a pivotal axis of the lever is on one side of a line extending between the pivotal connection of the intermediate link with the blocking member and the pivotal connection of the intermediate link with the lever, such that abutment of the blocking member against a tab portion of the frame portion urges the intermediate link along said line, which urges the lever in the second direction.

26. The invention of claim 25, wherein as the operator shifts the lever in the first direction from the cradle said line shifts to the other side of the pivotal axis of the lever.

27. The invention of claim 26, wherein abutment of the lever against the cradle prevents the blocking member from pivoting in response to abutment with the tab, and locks the first and second frame portions against pivotal motion with respect to each other.

28. The invention of claim 27, wherein abutment of the lever against the cradle prevents the blocking member from pivoting in response to abutment with the tab, and locks the first and second frame portions against pivotal motion with respect to each other.

29. A mechanism comprising:
a mower deck pivotal to a service position whereat the underside of the mower deck is exposed for maintenance, said mower deck being coupled with a vehicle,
a frame structure coupled with the vehicle, said deck being supported by the frame structure, said frame structure comprising:
a first portion pivotally coupled with the vehicle, and
a second portion pivotally coupled with the first portion,
ground engaging wheels coupled with the second portion,
a locking mechanism coupled between the first and second frame portions, said locking mechanism being engagable by an operator to rigidly fix the first and second portions of the frame with respect to each other, said locking mechanism being releasable by said operator for allowing the first and second frame portions to pivot with respect to each other, and
a lever operatively coupled between the first and second frame portions for shifting the first and second frame portions into proper alignment with each other such that the locking mechanism can be engaged, wherein shifting of the lever in a first direction releases the locking mechanism for allowing the first and second frame portions to pivot with respect to each other, and shifting of said lever in a second direction engages the locking mechanism for rigidly fixing the first and second frame portions with respect to each other,
wherein said locking mechanism further comprises:
a pivotable blocking member which pivots in response to pivotal motion of the lever, wherein said blocking member is pivotally mounted to one of the frame portions and operatively abuts the other of the frame portions for preventing relative motion between the first and second frame portions when the locking mechanism is engaged, and
an intermediate link operatively extending between the lever and the blocking member for transmitting pivotal motion therebetween,
wherein said abutment of the blocking member against said frame portion urges the lever in the second direction when the locking mechanism is engaged.

30. The invention of claim 29, and further comprising a cradle member against which the lever abuts for limiting the pivotal movement of the lever in the second direction.

31. The invention of claim 30, wherein in the locked mode a pivotal axis of the lever is on one side of a line extending between the pivotal connection of the intermediate link with the blocking member and the pivotal connection of the intermediate link with the lever, such that abutment of the blocking member against the tab urges the intermediate link along said line, which urges the lever in the second direction.

32. The invention of claim 31, wherein as the operator shifts the lever in the first direction from the cradle said line shifts to the other side of the pivotal axis of the lever.

33. The invention of claim 30, wherein abutment of the lever against the cradle prevents the blocking member from pivoting in response to abutment with the tab, and locks the first and second frame portions against pivotal motion with respect to each other.

34. The invention of claim 31, wherein abutment of the lever against the cradle prevents the blocking member from pivoting in response to abutment with the tab, and locks the first and second frame portions against pivotal motion with respect to each other.

35. A mechanism comprising:
a mower deck pivotal to an upright service position whereat the underside of the mower deck is exposed for maintenance, said mower deck being coupled with a vehicle,
a frame structure coupled with the vehicle, said deck being supported by the frame structure, said frame structure comprising:
a first portion pivotally coupled with the vehicle, and
a second portion pivotally coupled with the first portion,
ground engaging wheels coupled with the second portion,
a locking mechanism coupled between the first and second frame portions, said locking mechanism being engagable by an operator to rigidly fix the first and second portions of the frame with respect to each other, said locking mechanism being releasable by said operator for allowing the first and second frame portions to pivot with respect to each other, and
a lever shiftable in a first direction for releasing the locking mechanism for allowing the first and second frame portions to pivot with respect to each other, said lever being shiftable in a second direction for engaging the locking mechanism for rigidly fixing the first and second frame portions with respect to each other,
said locking mechanism further comprises:
a pivotable blocking member which pivots in response to pivotal motion of the lever, said blocking member is pivotally mounted to one of the frame portions and operatively abuts the other of the frame portions for preventing relative motion between the first and second frame portions when the locking mechanism is engaged, and
an intermediate link operatively extending between the lever and the blocking member for transmitting pivotal motion therebetween, wherein said abutment of the blocking member against said frame portion urges the lever in the second direction when the locking mechanism is engaged.

36. The invention of claim 35, and further comprising a cradle member against which the lever abuts for limiting the pivotal movement of the lever in the second direction.

37. The invention of claim 36, wherein in the locked mode a pivotal axis of the lever is on one side of a line extending between the pivotal connection of the intermediate link with the blocking member and the pivotal connection of the intermediate link with the lever, such that abutment of the blocking member against the tab urges the intermediate link along said line, which urges the lever in the second direction.

38. The invention of claim 37, wherein as the operator shifts the lever in the first direction from the cradle said line shifts to the other side of the pivotal axis of the lever.

39. The invention of claim 36, wherein abutment of the lever against the cradle prevents the blocking member from pivoting in response to abutment with the tab, and locks the first and second frame portions against pivotal motion with respect to each other.

40. The invention of claim 37, wherein abutment of the lever against the cradle prevents the blocking member from pivoting in response to abutment with the tab, and locks the first and second frame portions against pivotal motion with respect to each other.

41. A mechanism, comprising:
   a mower deck pivotal to an upright service position whereat the underside of the mower deck is exposed for maintenance, said mower deck being coupled with a vehicle,
   a frame structure coupled with the vehicle, said deck being supported by the frame structure, said frame structure comprising:
      a first portion pivotally coupled with the vehicle, and
      a second portion pivotally coupled with the first portion,
   ground engaging wheels coupled with the second portion,
   a locking mechanism coupled between the first and second frame portions, said locking mechanism being engagable by an operator to rigidly fix the first and second portions of the frame with respect to each other, said locking mechanism being releasable by said operator for allowing the first and second frame portions to pivot with respect to each other,
   a lever shiftable in a first direction for releasing the locking mechanism for allowing the first and second frame portions to pivot with respect to each other, said lever being shiftable in a second direction for engaging the locking mechanism for rigidly fixing the first and second frame portions with respect to each other,
   said lever being operatively coupled between the first and second frame portions for shifting the first and second frame portions into proper alignment with each other as the lever is shifted in the second direction,
   wherein said locking mechanism further comprises:
      a pivotable blocking member which pivots in response to pivotal motion of the lever, wherein said blocking member is pivotally mounted to one of the frame portions and operatively abuts the other of the frame portions for preventing relative motion between the first and second frame portions when the locking mechanism is engaged, and
      an intermediate link operatively extending between the lever and the blocking member for transmitting pivotal motion therebetween, and
      said abutment of the blocking member against said frame portion urges the lever in the second direction.

42. The invention of claim 41, and further comprising a cradle member against which the lever abuts for limiting the pivotal movement of the lever in the second direction.

43. The invention of claim 42, wherein in the locked mode a pivotal axis of the lever is on one side of a line extending between the pivotal connection of the intermediate link with the blocking member and the pivotal connection of the intermediate link with the lever, such that abutment of the blocking member against the tab urges the intermediate link along said line, which urges the lever in the second direction.

44. The invention of claim 43, wherein as the operator shifts the lever in the first direction from the cradle said line shifts to the other side of the pivotal axis of the lever.

45. The invention of claim 44, wherein abutment of the lever against the cradle prevents the blocking member from pivoting in response to abutment with the tab, and locks the first and second frame portions against pivotal motion with respect to each other.

46. The invention of claim 45, wherein abutment of the lever against the cradle prevents the blocking member from pivoting in response to abutment with the tab, and locks the first and second frame portions against pivotal motion with respect to each other.

* * * * *